United States Patent [19]
Lowell et al.

[11] Patent Number: 6,044,714
[45] Date of Patent: Apr. 4, 2000

[54] FLOWMETER FOR EXPLOSION-HAZARD ENVIRONMENTS

[75] Inventors: Francis Lowell, Falmouth; Allen Griswold; William Calder, both of North Falmouth, all of Mass.

[73] Assignee: Accusonic Technologies Inc., Falmouth, Mass.

[21] Appl. No.: 08/955,891

[22] Filed: Oct. 22, 1997

[51] Int. Cl.$^7$ ............................................. G01F 1/66
[52] U.S. Cl. ................................................. 73/861.28
[58] Field of Search .................... 364/510; 73/861.25, 73/861.04, 861.26, 861.27

[56] References Cited

U.S. PATENT DOCUMENTS

| | | | |
|---|---|---|---|
| 4,187,524 | 2/1980 | Peterson | 361/16 |
| 4,345,479 | 8/1982 | Loveland | 73/861.28 |
| 4,355,343 | 10/1982 | Gross | 361/100 |
| 4,467,245 | 8/1984 | Bloomer et al. | 315/75 |
| 4,882,934 | 11/1989 | Leffert et al. | 73/861.04 |
| 4,943,887 | 7/1990 | Bose | 361/56 |
| 4,967,302 | 10/1990 | Hutcheon et al. | 361/1 |
| 5,371,686 | 12/1994 | Nabity et al. | 364/510 |
| 5,510,942 | 4/1996 | Bock et al. | 361/16 |

*Primary Examiner*—Benjamin R. Fuller
*Assistant Examiner*—Jewel V. Thompson
*Attorney, Agent, or Firm*—Cesari & McKenna, LLP

[57] ABSTRACT

A pulse generator (48) in a flowmeter system (10) transmits an excitation pulse to a transducer assembly (12) by way of a signal-conduction medium (20) located in a region subject to an explosion hazard. The amplitude of the excitation pulse is great enough that it would ordinarily trigger an explosion in the hazardous region if one of its cables (22, 23) were to break. But a saturable-core transformer (T1) so limits the excitation pulse's duration as to prevent the explosion.

18 Claims, 5 Drawing Sheets

FLOWMETER FOR EXPLOSION-HAZARD ENVIRONMENTS

BACKGROUND OF THE INVENTION

The present invention concerns meters, such as those for measuring flow and fluid level, that make measurements by sending acoustic signals through fluids. It particularly concerns meters that are to be employed in explosion-hazard areas.

A typical way to measure a fluid's flow rate—either volume flow rate or velocity—is to send acoustic energy between two locations through the fluid, measure the delay between transmission from the one location and arrival at the other, repeat the operation in the reverse direction, and infer the flow rate from the difference. Another approach is to infer the flow rate from the correlation between the backscatter records that result from two successive acoustic-energy pulses. In both cases, the measurements commonly involve lossy fluids and noisy environments, so it is usually preferable to employ a relatively high-amplitude acoustic signal for this purpose.

But the ability to provide such high-amplitude signals is frequently limited by the possibility that explosive gases will be present, either at the location of the fluid whose flow is to be measured or in the path between that location and a monitoring location, where the flow-rate indication is displayed or recorded. In the presence of such gases, sparks resulting from signal-conductor faults can cause explosions.

Flowmeter suppliers have addressed this problem by so designing the system that any high voltages that occur as a result of a failure in the typically safe monitoring location cannot propagate from the safe region to the hazardous region along the signal lines that connect them. But the resultant low power that the remotely located transducers receive tends to keep the acoustic-signal amplitude low and thereby make the measurement relatively vulnerable to noise.

Some systems reduce noise effects by combining the numerous transmissions' records to produce a single measurement; the noise in successive records tends to cancel, while the desired signals reinforce each other. Still, the lower the acoustic-signal amplitude, the greater the number of such records that need to be added together, and the longer the time required for a single measurement. Particularly when the fluid flow is turbulent, moreover, the additional accuracy that results from adding together more records quickly diminishes. Indeed, there comes a point at which adding more records is actually counterproductive; if the time between the first and last transmissions is too great, the signal components of interest change enough that they no longer reinforce each other.

One way to avoid this problem is to use explosion-proof conduit to encase the cables that carry signals between the monitoring and monitored locations. But the cost and difficulty of working with the resultant cable make this approach too expensive for many applications.

One might propose instead to use an expedient that is employed in some other applications. If the transducer itself is not in a hazardous location, or if it can be provided with some type of safe container, energy supplied from the cable at low voltage levels can be stored up over a period of time and then concentrated into a high-power pulse. But even without the need for a safe container, the energy-storage circuitry required by such an approach greatly increases the expense of the apparatus at the transducer location, where only relatively inexpensive transducers need to be provided in non-hazardous installations. And the improvement would likely be illusory, anyway, since the time required to store the necessary energy would reduce the number of signal records that could be taken before the signal components of interest change too much to reinforce each other.

SUMMARY OF THE INVENTION

We have recognized that we can provide relatively high-amplitude drive signals in remote flowmeter transducers even in explosion-hazard environments without the delay and/or expense that conventional approaches impose. Our approach is simple: we limit the high-voltage pulses' voltage-duration products. It has been accepted for some time in many mining applications that high-voltage pulses can be safely employed in explosive-gas environments if the pulses' durations are kept appropriately low. We now apply this principle to flowmeter operation to obtain fast, accurate performance even in hazardous environments.

Specifically, although the excitation pulses that we send from the monitoring location to the monitored location exceed 50 volts and are thus in excess of the amplitudes that are ordinarily considered safe in most explosion-hazard environments, we limit the voltage-duration product to their durations to 750 V-$\mu$sec., and preferably to 500 V-$\mu$sec. By this simple expedient, we avoid the explosion hazard in most circumstances, yet we are able to put much more energy into each excitation pulse than had heretofore been considered safe.

Some embodiments of the invention implement this concept by employing a saturable-core transformer to couple a pulse source to the signal medium that conducts the excitation pulse to the transducers. Any primary-winding pulses that would otherwise cause secondary-winding pulses whose voltage-duration products exceed the limit will cause the transformer's core to saturate and thus limit the secondary pulses to the approved range.

One might conclude that sub-nominal-voltage primary-winding pulses would pose no problem in such an arrangement. But we have additionally recognized that excessively low primary-winding pulses can re-introduce the explosion hazard, so we compensate for this in certain embodiments by preventing excitation-pulse generation when circumstances are such that excessively low primary-winding pulses are likely.

BRIEF DESCRIPTION OF THE DRAWINGS

The invention description below refers to the accompanying drawings, in which.

DETAILED DESCRIPTION OF AN ILLUSTRATIVE EMBODIMENT

Figure 1:
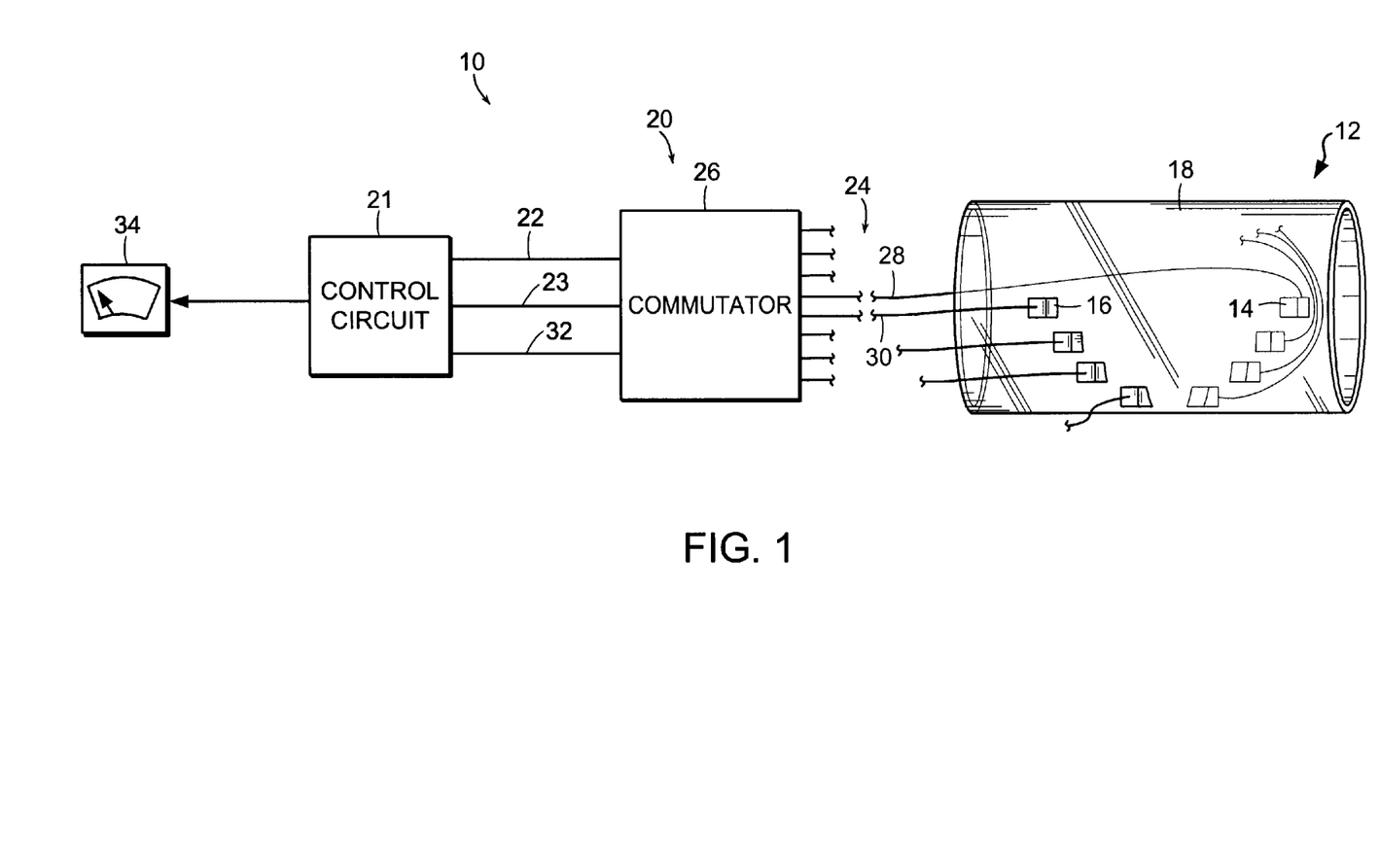
FIG. 1 is a block diagram of a flowmeter system that employs the present invention's teachings.

FIG. 1's flowmeter system 10 includes a transducer array 12 that comprises transducers such as transducers 14 and 16. The system 10 infers the flow rate of a fluid flowing through, say, a pipe 18 by observing the transit times of acoustic signals that propagate between transducers 14 and 16.

Typically, the transducers are disposed remotely from the location where readings are taken. So a signal-conduction medium 20 conducts signals between the transducer array 12 and control circuitry 21 for driving the transducers and inferring flow rates from their outputs. Medium 20 may take the form of transmission and reception signal-line pairs 22 and 23, cables 24, and a commutator 26, which connects the transmission and reception lines to selected ones of cables 24, e.g., to cables 28 and 30 respectively connected to transducers 14 and 16. The signal lines 22 and 23, as well as commutator 26, are typically disposed at the same location as control circuit 21, whereas the cables 24 typically extend from that location to the transducer assembly's remote location.

Control circuit 21 sends an excitation pulse and selection signals to the commutator 26 by way of lines 22 and 32, respectively. The commutator 26 forwards the excitation to a coaxial cable that the selection signals specify. If the control circuit has selected the path that transducers 14 and 16 define, the commutator circuit 26 alternately applies the pulses to cables 28 and 30.

The corresponding transducer 14 or 16 responds to the excitation pulse by sending an (exponentially decaying) oscillatory pulse through the fluid to the other transducer. The other transducer responds in turn with a (very low-amplitude) electrical signal that the other cable 28 or 30 conducts to the commutator 26. The commutator 26 forwards that electrical signal by way of signal lines 23 to the control circuit 21, which measures the delay between the acoustic signal's transmission and reception.

The control circuit 21 then switches the commutator 26's state and repeats the operation, thereby determining the delay that occurs when the acoustic signal propagates through the fluid in the reverse direction. The control circuit 21 infers the flow rate from the difference between the two delays and generates an indication of the flow rate thus inferred, as the drawing's meter 34 indicates conceptually.

Figure 2:
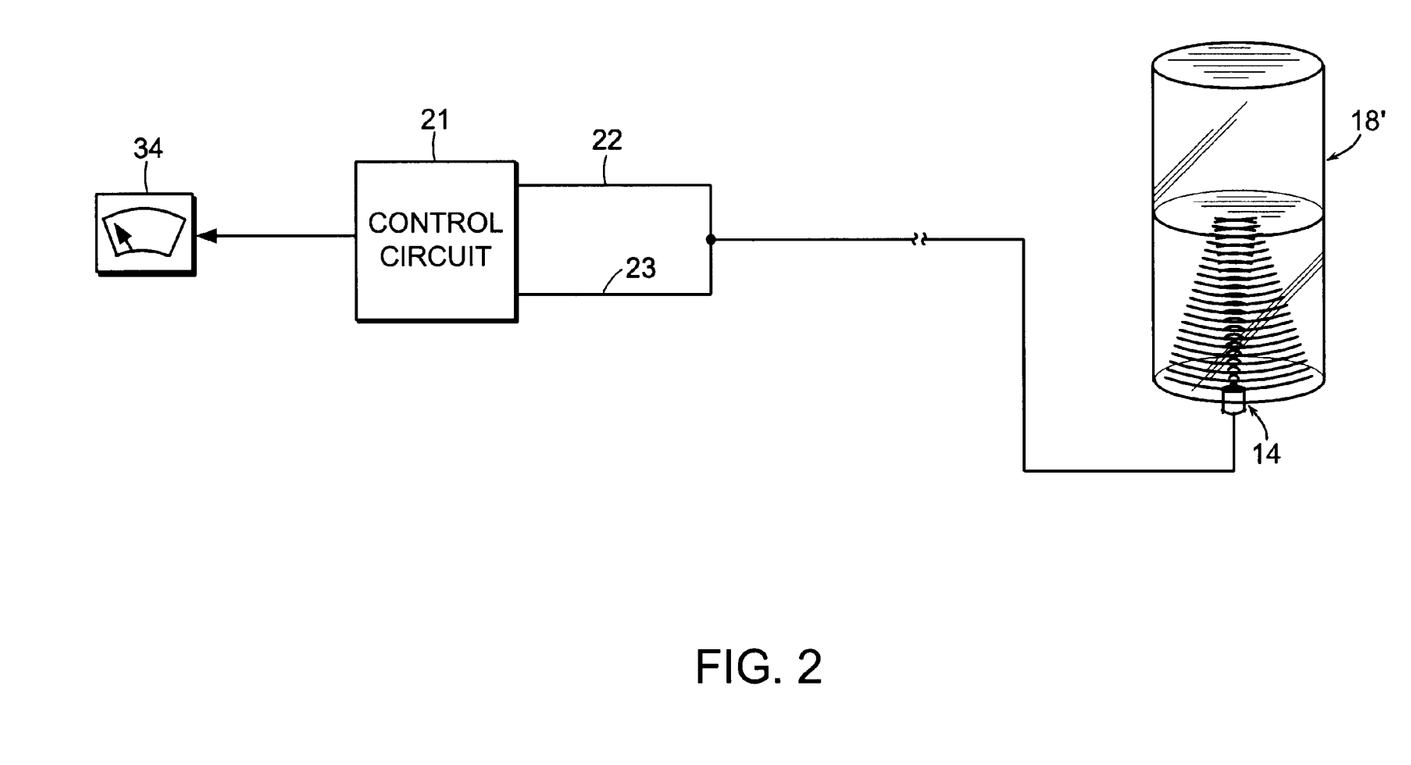
FIG. 2 is a block diagram of a range-measurement system in which the present invention's teachings can be employed.

In principle, the measurement method just described is straightforward. But those skilled in the art will recognize that the procedure employed to implement it can be quite elaborate. In most cases, for instance, the control circuit processes the received signals by means of filters that are tuned to the transducers' characteristic frequencies or otherwise match the signal that propagates through the fluid. Also, noise considerations often make it necessary for the transmission in each direction to be repeated several times for each measurement so that the records of the received signals can be added together. This tends to reinforce the information signal and suppress noise. As the drawing suggests, measurements will normally be taken by more than one transducer pair so as to obtain a flow profile from which the flow rate of interest can be determined, but the present invention's teachings do not require multiple paths—or, indeed, any of the specific signal processing mentioned above. For example, the flow-measurement technique may instead be to infer the flow rate from the correlation between backscatter records from successive same-transducer pulses. In fact, the present invention's teachings can be practiced in an apparatus that does not measure flow at all. For example, FIG. 2 depicts an arrangement in which a single transducer 14 both transmits the oscillatory pulse and receives a resultant echo that the liquid surface produces. Such an arrangement can be used to measure the liquid depth or the range to the interface between settled sludge and relatively sludge-free liquid.

All such arrangements can benefit from the present invention's teachings. But flow-rate measurements usually employ the above-described features, which can make measurements relatively time-consuming, and restrictions on excitation-pulse amplitude are particularly onerous as a result. This is because low-amplitude excitation signals result in low-amplitude responses. In long-path-length installations such low-amplitude responses have to be repeated a relatively large number of times if the desired signal is to be pulled out of the noise.

Figure 3:
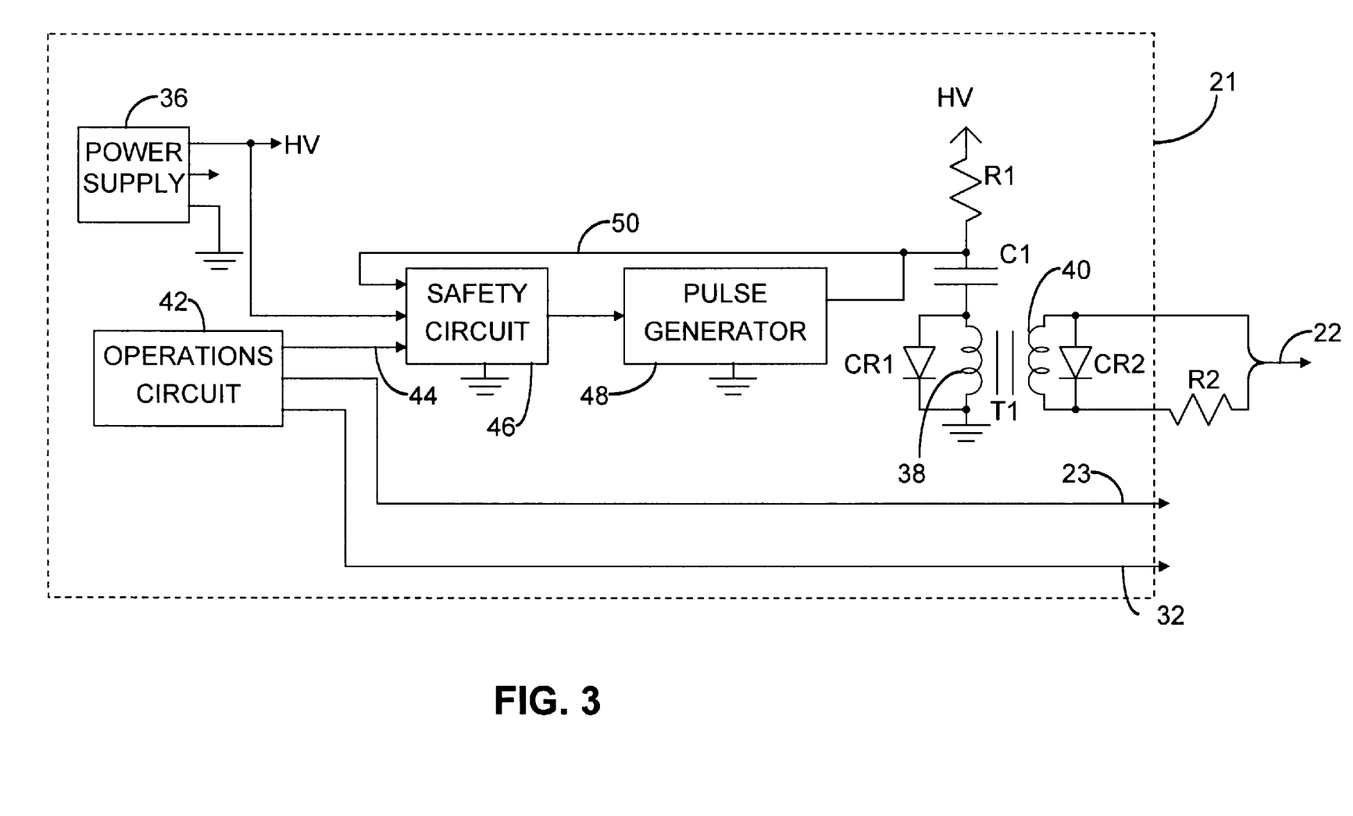
FIG. 3 is a block diagram that illustrates the flowmeter system's control circuit in more detail.
Figure 4:
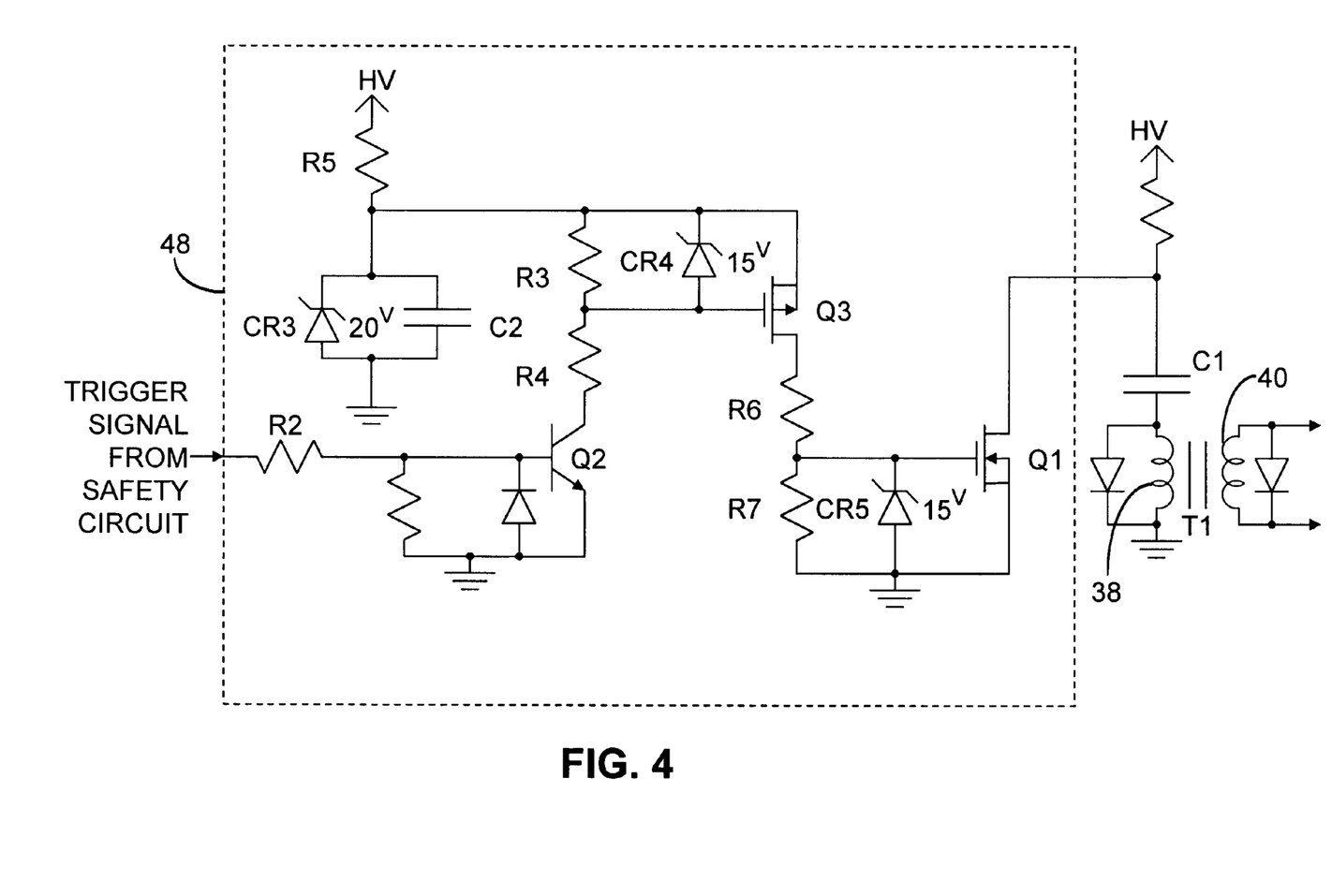
FIG. 4 is a schematic diagram of the control circuit's pulse-generator circuitry.
Figure 5:
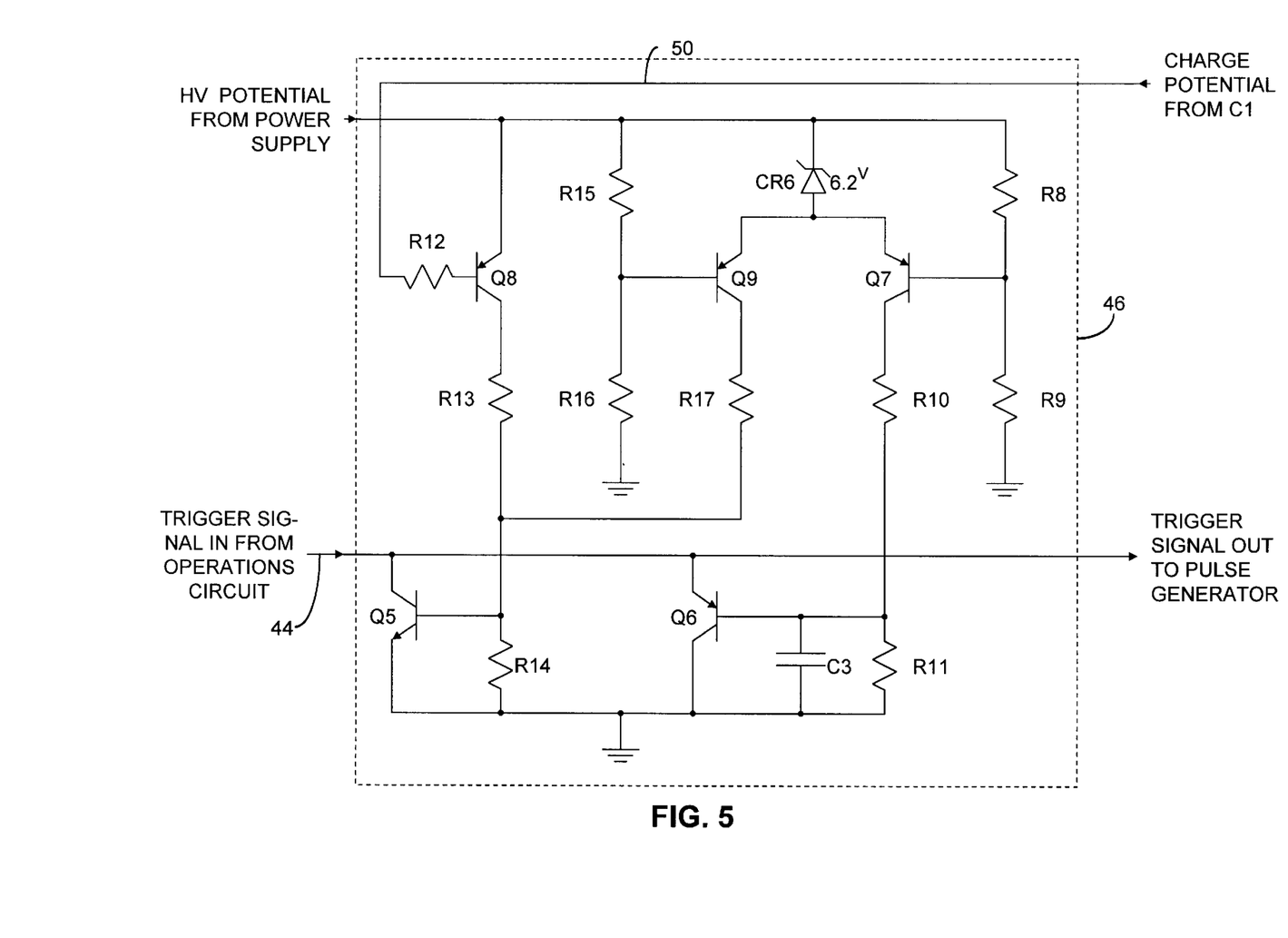
FIG. 5 is a schematic diagram of the control circuit's safety circuit.

But we have recognized that limiting the pulse's voltage-duration product makes it practical to employ a high-voltage excitation signal despite the explosion hazard. FIGS. 3, 4, and 5 illustrate several techniques that the illustrated embodiment employs to limit pulse duration.

One technique involves employing a saturable-core transformer T1 (FIG. 3) to transmit the excitation pulse over signal line 22 to the commutator 26 (FIG. 1). The high-voltage output port of a power supply 36 is connected across the series combination of a current-limiting resistance R1, a capacitance C1, and the transmitter T1's primary winding 38. This applies 185 V across this series combination and charges the capacitance C1 to that voltage at a rate that the resistance R1 so limits that little resultant signal appears in the transformer T1's secondary winding 40. To transmit a pulse, an operations circuit 42 transmits a trigger signal on line 44 to a safety circuit 46, which ordinarily forwards it to a pulse generator 48. In response, pulse generator 48 shorts the capacitance circuit's upper end to ground and thereby applies a −185 V potential to the transformer T1's primary winding 38. The transformer has a turns ratio of 1:5, so the transformer sends a 925 V pulse to the selected transducer. Diodes CR1 and CR2 limit to a single half cycle the oscillation that would otherwise occur in the tank circuit that the primary winding 38 forms with the capacitance circuit C1.

In a typical installation, the control circuit 21 will be located in a safe region, so the nature of the signals employed there does not present an explosion problem. But it is intended that some of the signal path downstream of the transformer T1 may be subject to such a hazard. This hazard is suppressed, despite the transmitted pulse's high voltage level, because the transformer's saturable core limits the pulse duration in accordance with the applied pulse's voltage.

Specifically, the voltage applied across the transformer's primary windings 38 results in an increasing current and thus an increasing magnetic flux in the transformer's magnetic core. As is conventional in transformer operation, it is this rate of magnetic-flux change that results in the transformer secondary's output pulse, which is transmitted to the transducer. Since the applied pulse begins at 185 V, the rate of flux increase is high, and the core accordingly reaches its saturation level quickly. In the illustrated embodiment, the flux reaches the saturation level in approximately 0.4 $\mu$sec if the applied pulse is of the intended voltage. After saturation, the core's incremental permeability falls to little more than that of air, and the primary current that the winding resistance thereafter permits results in very little increase in core flux and thus in little voltage on the transformer secondary. That is, the output pulse collapses, so the pulse duration is not great enough to cause an explosion in the expected hazardous environment. An impedance-matching resistor R2 suppresses the resultant signal's tendency to be prolonged by echoes that transmission-line discontinuities or transducer mismatch could otherwise cause. An R2 value of 83 Ω will cause any ringing on 75 Ω RG59 cables or 93 Ω RG62 cables to be minimal.

This use of a saturable-core transformer makes this duration-limiting technique particularly robust: if the trigger signal lasts too long for some reason, the core saturation still limits to a safe duration the pulse transmitted into the hazardous region. Also, if the applied voltage exceeds the nominal level, the transformer core saturates more quickly, making the pulse duration shorter, as it should be to prevent an explosion.

FIG. 4 depicts the pulse-generator circuit 48 in detail. As will now be explained, that circuit responds to the trigger pulse from the safety circuit by turning on a field-effect transistor Q1, which thereby shorts capacitance circuit C1's upper end to ground and thereby places across the transformer's primary windings 38 the potential difference to which C1 has been charged between trigger pulses.

Specifically, a trigger pulse appearing at the left of resistor R2 turns on a transistor Q2. Transistor Q2 thereupon draws current through resistors R3 and R4 from a 20-volt level that a circuit consisting of resistor R5, 20-volt zener diode CR3, and capacitor C2 derives from the power supply's high-voltage output. The resultant voltage at the R3–R4 junction drives a further transistor Q3 into conduction. A 15-volt zener CR4 keeps Q3's source-to-gate voltage within rated limits.

When transistor Q3 conducts, it draws current through further resistors R6 and R7, and the resultant voltage at their junction causes transistor Q1 to short capacitance C1's upper end to ground while a 15-volt zener CR5 keeps Q1's source-to-gate voltage within rated limits. As was explained above, the result is that an excitation pulse is transmitted to the selected transducer.

The safety circuit 46 (FIG. 3) forwards the trigger signal from its source, operations circuit 42, only if certain safety criteria are met. FIG. 5 shows how the safety circuit imposes these criteria. If the criteria are not met, transistor Q5 or Q6 shorts trigger-signal path 44 to ground and thereby prevents the trigger signal from propagating along that path to the pulse generator 48.

One of the safety criteria is that the power supply 36's high-voltage output HV not be lower than a predetermined minimum of, say, 165 V. As was explained above, the HV value is the voltage to which the capacitance circuit C1 can be charged, so the magnitude of HV determines the amplitude of the excitation signal sent to the selected transducer. Since the conventional approach to dealing with explosion-hazard environments is to keep signal voltages low, one might suppose that too low a signal voltage would not present a safety problem. But we have discovered that too low a voltage applied to the transformer primary windings makes the pulse duration long enough to result in an explosion hazard even though the pulse amplitude is relatively low.

For this reason, we provide a 6.2 V zener diode CR6 connected in series with the emitter of a transistor Q7 whose base receives the output of a voltage divider consisting of resistors R8 and R9. The high-voltage output HV from FIG. 3's power supply 36 drives that voltage divider, and the voltage drop across resistor R8 is not great enough to turn on transistor Q7 if the HV level does not exceed the 165 V minimum. And if Q7 is not turned on, transistor Q6 will not be back-biased by voltage that results from current cannot flow through resistors R10 and R11, so Q6 will clip any trigger pulse on line 44 to a single base-to-emitter drop. Capacitor C3 provides a low-impedance base-current path that enables transistor Q6 to conduct heavily for that purpose.

Even if the HV level is high enough, the voltage applied to the transformer primary windings can still be too low if the time between trigger pulses is too short to permit the capacitance circuit C1 to charge to the requisite level. To guard against this possibility, the C1 voltage on line 50 is applied through resistor R12 to the base of transistor Q8, which accordingly conducts unless the C1 voltage is very near the HV level. So current flows through resistors R13 and R14, and Q5 therefore shorts the trigger-signal line 44 to ground until C1 is adequately charged.

Although we have observed no untoward consequences of too high an HV level, the safety circuit additionally refrains from forwarding trigger signals when the HV level exceeds 208 V. Just as voltage divider R8, R9 does, voltage divider R15, R16 receives the high-voltage level. When the HV level exceeds 208 V, the voltage drop across R15 turns on transistor Q9, and the resultant current flow through resistors R17 and R14 causes Q5 to short the trigger-signal line 44 to ground.

To enhance safety even further or enhance reliability, one may prefer to provide some circuit elements redundantly. In one implementation, for instance, we have wired three instances of FIG. 5's safety circuit in parallel so that the safety effects remain if one or two of the circuits fail. Also, capacitance circuit C1 is implemented as nine separate parallel capacitors so that the system will continue to operate if one or two of them so fails that its capacitance is reduced. Similarly, several of the resistances are implemented as three parallel resistors, and diodes CR1 and CR2 are implemented in three diodes each.

Now, the present invention's broader teachings do not require the use of a transformer. It is only necessary that some circuitry be provided to limit the excitation pulse's voltage-duration product. For example, the illustrated embodiment is intended for so-called Class I, Division I, Group C hazards and ordinarily produces pulses that are on the order of 1000 V in amplitude, which the saturable-core transformer limits to about 0.3 $\mu$sec in duration to produce a voltage-duration product of around 300 V-$\mu$sec, the actual voltage—and the actual duration for a given voltage—depending on loading. But these parameters are not at all critical to the present invention, since susceptibility to explosion can depend on many factors. Our studies suggest that most pulses will not produce explosions when the amplitude-duration product is 750 V-$\mu$sec but that a product of 500 V-$\mu$sec is more predictably safe, so a conservative derating approach suggests designing a voltage-duration product of 330 V-$\mu$sec.

Although the present invention's broader teachings do not require the saturable-core transformer, we consider the transformer to be particularly beneficial, because it reduces pulse duration as pulse amplitude increases; roughly speaking, the duration is inversely proportional to the amplitude. Although the relationship between pulse voltage and the duration to which the pulse must be restricted in order to avoid explosion may not be precisely reciprocal, the circuit parameters can readily be chosen to prevent explosion for a very wide range of excitation-pulse voltages.

It can thus the seen that the present invention can be employed in a wide range of embodiments, and it therefore constitutes a significant advance in the art.

What is claimed is:

1. For operating in an explosion-hazard environment, a flowmeter comprising:

A) a transducer assembly operable by application thereto of an excitation pulse to transmit acoustic energy into a fluid, receive resultant sonic signals from the fluid, and produce a receiver signal representative of the sonic signals thus received;

B) a signal-conduction medium, coupled to the transducer assembly, for conducting excitation pulses to the transducer assembly and receiver signals from the transducer assembly; and C) control circuitry for generating excitation pulses whose amplitudes exceed 50 volts and whose amplitude-duration products are less than 750 V-μsec., applying the excitation pulses to the signal-conduction medium, receiving the resultant receiver signals from the signal-conduction medium, and producing in response an indication of the fluid's flow rate.

2. A flowmeter as defined in claim 1 wherein:

A) the control circuitry includes a transformer that comprises primary windings, secondary windings, and a saturable core that saturates in response to primary-winding pulses that would otherwise result in secondary-winding amplitude-duration products greater than 750 V-μsec;

B) the signal medium receives the excitation pulses from the secondary windings; and C) the control circuitry causes the excitation pulses on the secondary windings by applying pulses to the primary windings.

3. A flowmeter as defined in claim 2 wherein the control circuitry includes circuitry that prevents it from applying to the primary windings a pulse whose voltage amplitude is less than a predetermined minimum.

4. A flowmeter as defined in claim 2 wherein the control circuitry includes:

A) a power supply comprising a high-voltage port and producing a high voltage at the high-voltage port;

B) a capacitance circuit coupled to the high-voltage port for charging thereby;

C) a pulse-generator circuit that discharges the capacitor circuit into the primary windings in response to application of trigger pulses thereto;

D) a trigger-signal source that generates trigger pulses; and

E) a trigger-forwarding circuit, coupled to the trigger-signal source and the pulse-generator circuit, that forwards the trigger signals to the pulse-generator circuit if and only if a predetermined set of at least one predetermined safety criterion is met.

5. A flowmeter as defined in claim 4 wherein one said safety criterion is that the high voltage exceeds a predetermined minimum high voltage.

6. A flowmeter as defined in claim 4 wherein one said safety criterion is that the trigger-forwarding circuit has forwarded no previous pulse to the pulse-generator circuit for a predetermined duration.

7. A flowmeter as defined in claim 6 wherein the predetermined duration is at least 10 milliseconds.

8. A flowmeter as defined in claim 2 wherein:

A) the transducer assembly transmits the acoustic energy in opposite directions along a path through the fluid; and B) the control circuitry determines the fluid-flow rate from the difference between the times required for the acoustic energy to traverse the path in the opposite directions.

9. A flowmeter as defined in claim 8 wherein the amplitude-duration products of the excitation pulses are less than 500 V-μsec.

10. A flowmeter as defined in claim 9 wherein the amplitude-duration products of the excitation pulses are less than 330 V-μsec.

11. A flowmeter as defined in claim 1 wherein:

A) the transducer assembly transmits the acoustic energy in opposite directions along a path through the fluid; and B) the control circuitry determines the fluid-flow rate from the difference between the times required for the acoustic energy to traverse the path in the opposite directions.

12. A flowmeter as defined in claim 11 wherein the amplitude-duration products of the excitation pulses are less than 500 V-μsec.

13. A flowmeter as defined in claim 12 wherein the amplitude-duration products of the excitation pulses are less than 330 V-μsec.

14. A flowmeter as defined in claim 1 wherein the amplitude-duration products of the excitation pulses are less than 500 V-μsec.

15. A flowmeter as defined in claim 14 wherein the amplitude-duration products of the excitation pulses are less than 330 V-μsec.

16. For operating in an explosion-hazard environment, a range meter comprising:

A) a transducer assembly operable by application thereto of an excitation pulse to transmit acoustic energy into a fluid, receive resultant sonic signals from the fluid, and produce a receiver signal representative of the sonic signals thus received;

B) a signal-conduction medium, coupled to the transducer assembly, for conducting excitation pulses to the transducer assembly and receiver signals from the transducer assembly; and C) control circuitry for generating excitation pulses whose amplitudes exceed 50 volts and whose amplitude-duration products are less than 750 V-μsec., applying the excitation pulses to the signal-conduction medium, receiving the resultant receiver signals from the signal-conduction medium, and producing a range indication in response.

17. For operating a flowmeter in an explosion-hazard environment, a method comprising the steps of:

A) providing a transducer assembly operable by application thereto of an excitation pulse to transmit acoustic energy into a fluid, receive resultant sonic signals from the fluid, and produce a receiver signal representative of the sonic signals thus received;

B) providing a signal-conduction medium, coupled to the transducer assembly, for conducting excitation pulses to the transducer assembly and receiver signals from the transducer assembly;

C) generating excitation pulses whose amplitudes exceed 50 volts and whose amplitude-duration products are less than 750 V-μsec., D) applying the excitation pulses to the signal-conduction medium;

E) receiving the resultant receiver signals from the signal-conduction medium; and F) producing in response an indication of the fluid's flow rate.

18. For making a range measurement in an explosion-hazard environment, a method comprising the steps of:

A) providing a transducer assembly operable by application thereto of an excitation pulse to transmit acoustic energy into a fluid, receive resultant sonic signals from the fluid, and produce a receiver signal representative of the sonic signals thus received;

B) providing a signal-conduction medium, coupled to the transducer assembly, for conducting excitation pulses to the transducer assembly and receiver signals from the transducer assembly;

C) generating excitation pulses whose amplitudes exceed 50 volts and whose amplitude-duration products are less than 750 V-$\mu$sec., D) applying the excitation pulses to the signal-conduction medium;

E) receiving the resultant receiver signals from the signal-conduction medium; and F) producing a range indication in response.

* * * * *